United States Patent
Shu et al.

(10) Patent No.: US 12,124,857 B2
(45) Date of Patent: Oct. 22, 2024

(54) SERVER MANAGEMENT APPARATUS AND SERVER MANAGEMENT METHOD

(71) Applicant: RAKUTEN MOBILE, INC., Tokyo (JP)

(72) Inventors: Seihin Shu, Tokyo (JP); Mohit Luthra, Singapore (SG); Tatsuhiko Narita, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 17/800,884

(22) PCT Filed: Aug. 30, 2021

(86) PCT No.: PCT/JP2021/031703
§ 371 (c)(1),
(2) Date: Aug. 18, 2022

(87) PCT Pub. No.: WO2023/031993
PCT Pub. Date: Mar. 9, 2023

(65) Prior Publication Data
US 2024/0192964 A1 Jun. 13, 2024

(51) Int. Cl.
*G06F 9/4401* (2018.01)
*G06F 8/30* (2018.01)
*G06F 9/445* (2018.01)

(52) U.S. Cl.
CPC ............ *G06F 9/4416* (2013.01); *G06F 8/30* (2013.01); *G06F 9/4406* (2013.01); *G06F 9/44505* (2013.01)

(58) Field of Classification Search
CPC .. G06F 9/4401; G06F 9/44505; G06F 9/4406; G06F 9/4416; G06F 8/30
USPC .......................... 713/1, 2; 709/222; 717/106
See application file for complete search history.

(56) References Cited

U.S. PATENT DOCUMENTS

| | | | |
|---|---|---|---|
| 6,931,558 B1* | 8/2005 | Jeffe | G06F 11/1464 714/6.32 |
| 8,417,926 B2* | 4/2013 | DeHaan | G06F 8/60 717/172 |
| 9,866,905 B1* | 1/2018 | Quinn | G06F 9/4416 |

(Continued)

FOREIGN PATENT DOCUMENTS

| | | | |
|---|---|---|---|
| JP | 2005-149334 A | | 6/2005 |
| JP | 2009176213 A | * | 8/2009 |

*Primary Examiner* — Ji H Bae
(74) *Attorney, Agent, or Firm* — Sughrue Mion, PLLC

(57) ABSTRACT

Disclosed herein is a server management apparatus, comprising: a server information acquisition unit configured to acquire configuration information and identifier information of a plurality of servers that constitute a network; a script generation unit configured to generate a script for booting each server for each of the plurality of servers based on the configuration information and the identifier information of the plurality of servers acquired; a remote disk setting unit configured to write the script generated by the script generation unit to a remote disk to be mounted on each of the plurality of servers to set the remote disk; and a command issuance unit configured to issue, to each of the plurality of servers via the network, a command to mount the remote disk set by the remote disk setting unit on a corresponding server.

7 Claims, 10 Drawing Sheets

(56) References Cited

U.S. PATENT DOCUMENTS

| | | | | |
|---|---|---|---|---|
| 2005/0038880 A1* | 2/2005 | Danforth | ................ | H04L 67/34 |
| | | | | 709/222 |
| 2012/0110312 A1* | 5/2012 | Domsch | ................ | G06F 9/4416 |
| | | | | 713/2 |
| 2015/0149758 A1* | 5/2015 | Temporelli | ................ | G06F 8/60 |
| | | | | 713/2 |
| 2022/0147335 A1* | 5/2022 | Juang | ................ | H04L 67/34 |

* cited by examiner

SERVER MANAGEMENT APPARATUS AND SERVER MANAGEMENT METHOD

CROSS REFERENCE TO RELATED APPLICATIONS

This application is a National Stage of International Application No. PCT/JP2021/031703 filed Aug. 30, 2021.

TECHNICAL FIELD

The present invention relates to a server management apparatus, a server management method, and a program thereof, and in particular to a technique for managing servers to be deployed in a large number of accommodating stations in a mobile network.

BACKGROUND ART

Conventionally, the network booting technique includes the PXE boot that employs a network card adapted to the PXE (Preboot execution Environment), the DHCP (Dynamic Host Configuration Protocol) server and the TFTP (Trivial File Transfer Protocol) server.

Patent Literature 1 discloses the network booting using the above technique and how to speed up the booting process.

LISTING OF REFERENCES

Patent Literature

PATENT LITERATURE 1: Laid-open Publication of Japanese Patent Application No. 2005-149334 A

SUMMARY OF THE INVENTION

Problems to be Solved by the Invention

The above conventional PXE boot necessarily requires the DHCP server and the TFTP server. Since a single DHCP server cannot be constructed to be in common with another network across network segments (i.e., routers), each of network segments needs to be equipped with its own DHCP server. Alternatively, the DHCP server is required to set up a DHCP relay to enable communication with another DHCP server on a different network.

Meanwhile, for recent large-scale networks such as mobile networks, efficiency and automation are essential in the construction, maintenance, and operation of the networks. For example, when newly constructing data centers (i.e., accommodating stations), it is required to deploy physical servers in each of data centers and then install an Operating System (OS) and the like on each of the deployed physical servers. However, those data centers are geographically distributed in a large number of locations, thus the OS installation needs to be performed remotely.

However, when installing an OS using the conventional PXE boot technique described above in such a large-scale network, for example, it is required to deploy the DHCP server in each of data centers or even in each of racks on which physical servers are deployed, and design networks based on respective environments or set up DHCP relays. In addition, each of nodes is required to make requests to the DHCP server and the TFTP server, respectively. As a result, it makes deploying servers in a large-scale network complicated and inefficient.

The present invention has been made in order to solve the above mentioned problems and an object thereof is to provide a server management apparatus, a server management method, and a program thereof capable of deploying servers in a large-scale network more expeditiously and efficiently.

Solution to Problems

In order to solve the above mentioned problems, according to one aspect of the present invention, there is provided a server management apparatus, comprising: a server information acquisition unit configured to acquire configuration information and identifier information of a plurality of servers that constitute a network; a script generation unit configured to generate a script for booting each server for each of the plurality of servers based on the configuration information and the identifier information of the plurality of servers acquired by the server information acquisition unit, the script including the configuration information and the identifier information of each server; a remote disk configuration unit configured to write the script generated by the script generation unit to a remote disk to be mounted on each of the plurality of servers to configure the remote disk; and a command issuance unit configured to issue, to each of the plurality of servers via the network, a command to mount the remote disk configured by the remote disk configuration unit on a corresponding server.

The identifier information acquired by the server information acquisition unit may include at least an IP (Internet Protocol) address of each server.

The server management apparatus may further comprise: a second command issuance unit configured to issue, to each of the plurality of servers via the network, a second command to turn on power of the server.

The server management apparatus may further comprise: a distribution unit configured to distribute, in response to a request from each of the plurality of servers to distribute an OS (Operating System) to be installed using the identifier information set for each server, the OS and an installation procedure to a source server of the request.

The booting may be a PXE boot, and the script may be an iPXE script.

According to another aspect of the present invention, there is provided a server management method performed by a server management apparatus, comprising steps of: acquiring configuration information and identifier information of a plurality of servers that constitute a network; generating a script for booting each server for each of the plurality of servers based on the configuration information and the identifier information of the plurality of servers, the script including the configuration information and the identifier information of each server; writing the script to a remote disk to be mounted on each of the plurality of servers to configure the remote disk; and issuing, to each of the plurality of servers via the network, a command to mount the remote disk on a corresponding server.

According to yet another aspect of the present invention, there is provided a server management program for causing a computer to execute server management processing, the program causing the computer to execute processing comprising: a server information acquisition process for acquiring configuration information and identifier information of a plurality of servers that constitute a network; a script generation process for generating a script for booting each server for each of the plurality of servers based on the configuration information and the identifier information of the plurality of servers acquired by the server information acquisition process, the script including the configuration information and the identifier information of each server; a remote disk configuration process for writing the script generated by the script generation process to a remote disk to be mounted on each of the plurality of servers to configure the remote disk; and a command issuance process for issuing, to each of the plurality of servers via the network, a command to mount the remote disk configured by the remote disk configuration process on a corresponding server.

Advantageous Effect of the Invention

According to embodiments of the present invention, it makes it possible to deploy servers in a large-scale network more expeditiously and efficiently.

The above mentioned and other not explicitly mentioned objects, aspects and advantages of the present invention will become apparent to those skilled in the art from the following embodiments (detailed description) of the invention by referring to the accompanying drawings and the appended claims.

DESCRIPTION OF EMBODIMENTS

Figure 1:
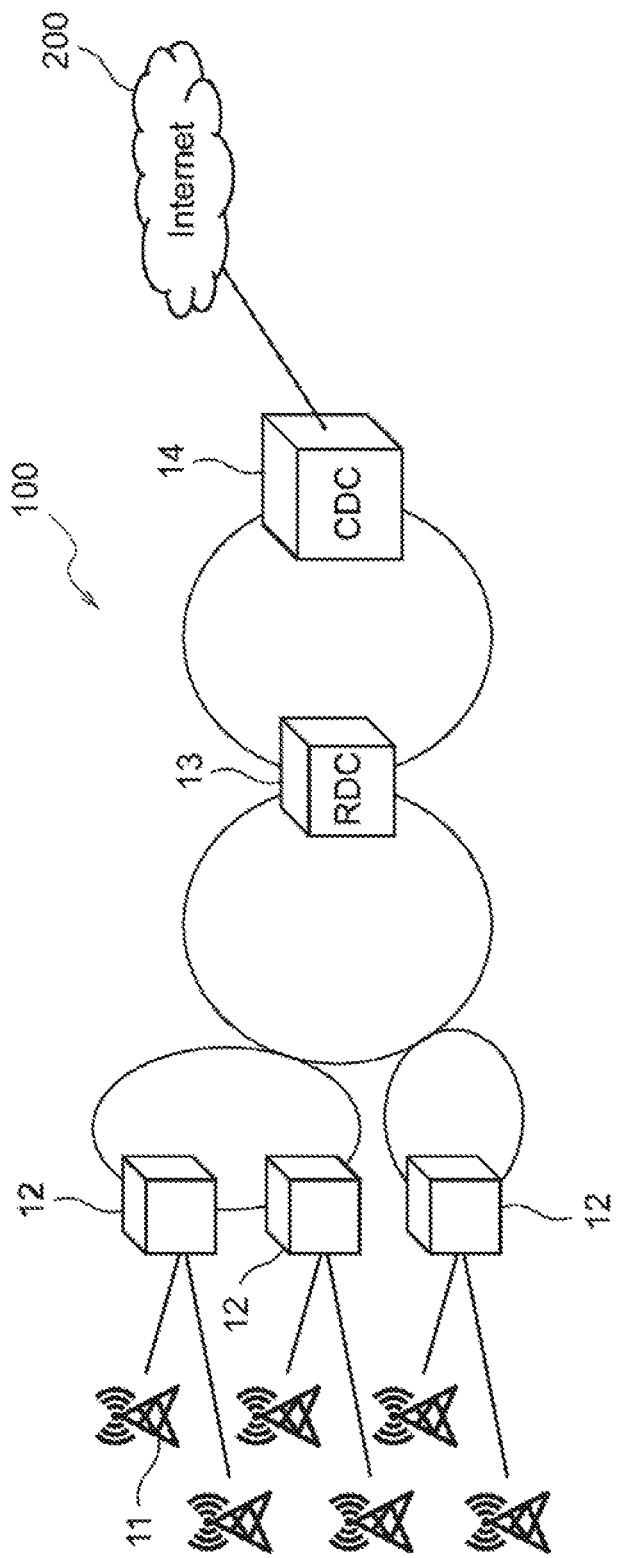
FIG. 1 is a conceptual diagram illustrating an exemplary network configuration of a mobile network according to the present embodiment of the present invention.

Hereinafter, embodiments of the present invention will be described in detail with reference to the accompanying drawings. Among the constituent elements disclosed herein, those having the same function are denoted by the same reference numerals, and a description thereof is omitted. It should be noted that the embodiments disclosed herein are illustrative examples as means for implementing the present invention, and should be appropriately modified or changed depending on a configuration and various conditions of an apparatus to which the present invention is applied, and the present invention is not limited to the following embodiments. Furthermore, it should be noted that all of the combinations of features described in the following embodiments are not necessarily essential to the solution of the present invention.

Hereinafter, a non-limiting example will be described in which a server management apparatus according to the present embodiment is implemented in a central data center that constitutes a core network of a mobile network constructed on a virtualization infrastructure, is connected to respective nodes (i.e., server devices) accommodated in a large number of accommodating stations (i.e., data centers) distributed in the mobile network, and performs provisioning of respective nodes. Here, the above node corresponds to a general-purpose server device that is capable of constituting the network virtualization infrastructure, and the server device to be provisioned includes a bare metal server, which is a server device before the OS (Operating System) is installed.

However, the present embodiment is not limited thereto. The server management apparatus may be implemented at any site other than the central data center, for example, in any data center that constitutes a backhaul network (i.e., Mobile Backhaul: MBH), which relays the Radio Access Network (RAN) to the core network.

FIG. 1 is a conceptual diagram illustrating an exemplary network configuration of a mobile network 100 including a network management apparatus according to the present embodiment.

In the mobile network 100 shown in FIG. 1, a mobile communicable terminal such as a smartphone and the Radio Access Network (RAN) communicate with each other wirelessly, and the transmitted information is relayed through the backhaul network (i.e., Mobile Backhaul: MBH) to the core network for processing. This allows the mobile communicable terminal to connect to the Internet 200 or connect to another company's network to make voice calls, or the like.

More particularly, the mobile network 100 includes base stations 11 and a plurality of accommodating stations 12 to 14. In FIG. 1, the accommodating station 12 is an edge data center, the accommodating station 13 is a Regional Data Center (RDC), and the accommodating station 14 is a Central Data Center (CDC). A backhaul network is constituted between the edge data center 12 and the central data center 14. It should be noted that, hereinafter, the edge data center is also referred to as a GC (Group unit Center) for differentiating from other types of data centers.

The mobile network 100 according to the present embodiment may be a virtualized network constructed on the virtualization infrastructure. The mobile network 100 realizes everything from the switching equipment of the backbone network to the radio access functions of the base stations by software on general-purpose servers.

The base station 11 is equipped with an antenna, a switchboard, a battery, and the like. The edge data center 12 is located near the base stations 11 and is connected to a plurality of base stations 11 via fiber-optic cables, or the like. The edge data center 12 realizes the RAN-related radio access functions.

The regional data center 13 is connected to a plurality of edge data centers 12. The regional data center 13 realizes, by software, the firewall/NAT (Network Address Translation), the CDN (Content Distribution Network), and various applications for edge computing.

The central data center 14 is connected to a plurality of regional data centers 13. The central data center 14 realizes core functions such as the EPC (Evolved Packet Core), the IMS (IP Multimedia Subsystem), or the like.

It should be noted that the number of respective data centers (i.e., accommodating stations), that is, the edge data center 12, the regional data center 13, and the central data center 14, is not limited to the number shown in FIG. 1. For example, although only one regional data center 13 and one central data center 14 are shown in FIG. 1, there may be a plurality of regional data centers 13 and central data centers 14, respectively.

Figure 2:
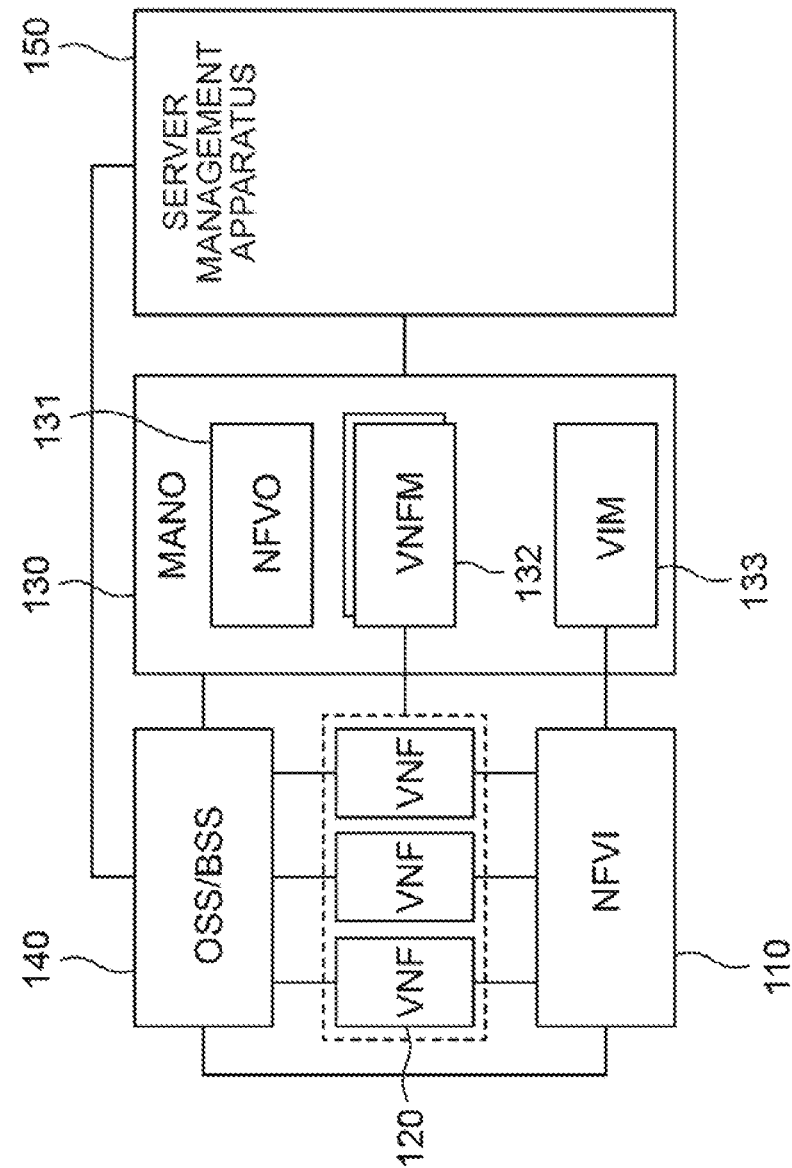
FIG. 2 is a block diagram illustrating an exemplary relationship between a virtualization infrastructure of the mobile network system and a server management apparatus according to the present embodiment.

FIG. 2 is a block diagram illustrating an exemplary relationship between the virtualization infrastructure constituting the mobile network 100 and a server management apparatus according to the present embodiment.

Each of constituent elements shown in FIG. 2 has a reference point. The lines connecting the constituent components shown in FIG. 2 indicate that connected constituent elements via the line can send and receive information to and from each other.

The NFVI (NFV Infrastructure) 110 is a network function virtualization infrastructure, and includes physical resources, a virtualization layer, and virtualized resources. The physical resources include hardware resources such as computing resources, storage resources, and transmission resources. The virtualization layer is a virtualizing layer such as a hypervisor for virtualizing the physical resources and providing the virtualized physical resources to the VNF (Network Function Virtualization) 120. The virtualized resources are the virtualized infrastructure resources provided to the VNF 120.

In other words, the NFVI 110 is an infrastructure that enables flexible handling of hardware resources, such as computing, storage, and network functions, as virtualized hardware resources such as virtualized computing, virtualized storage, and virtualized network, which are virtualized by the virtualization layer such as the hypervisor.

A plurality of general-purpose servers that constitute the NFVI 110 are grouped together and deployed in each of the data centers (i.e., accommodating stations) 12 to 14. The number, the placement positions, wiring, and the like, of the general-purpose servers to be deployed in each of the data centers 12 to 14 are predetermined depending on the type of data center (i.e., accommodating station type). In each of the data centers 12 to 14, the deployed general-purpose servers are connected by an internal network and are capable of sending and receiving information to and from each other. In addition, the data centers are connected to each other by a network, and the general-purpose servers in different data centers are capable of sending and receiving information to and from each other via the network.

The VNF 120 corresponds to applications running on virtual machines (VMs) on the general-purpose servers and implements the network functions by software. Although not specifically shown, each VNF 120 may be provided with a management function called an EM (Element Manager).

The NFVI 110 and the VNF 120 in FIG. 2 constitute the virtualized environment. In other words, the virtualized environment is constituted with three layers, in order from the lower layer: the hardware, the virtualization layer, and virtual machines.

The MANO (Management and Orchestration) 130 has management and orchestration functions for the virtualized environment. The MANO 130 includes the NFVO (NFV-Orchestrator) 131, the VNFM (VNF-Manager) 132, and the VIM (Virtualized Infrastructure Manager) 133.

The NFVO 131 orchestrates the NFVI resources, manages the lifecycle of network services, and provides integrated operational management of the entire system. The NFVO 131 is capable of performing processing in response to instructions from the OSS/BSS (Operation Support System/Business Support System) 140, which will be described below.

The VNFM 132 manages the lifecycle of each of the VNFs 120. It should be noted that the VNFM 132 may be arranged in the MANO 130 as a dedicated VNFM corresponding to each of VNFs 120. Alternatively, a single VNFM 132 may manage the lifecycle of two or more VNFs 120. In this case, the VNFM 132 may be a general-purpose VNFM that supports VNFs 120 provided by different vendors.

The VIM 133 performs operational management of the resources of the VNFs 120.

The OSS/BSS 140 is an integrated management system for the mobile network 100.

Here, the OSS is a system (i.e., equipment, software, mechanism, and the like) necessary for constructing and operating the desired services, and the BSS is an information system (i.e., equipment, software, mechanism, and the like) used for billing, invoicing, and customer services.

The server management apparatus 150 is connected to NFVI 110, the OSS/BSS 140 and the MANO 130 in a communicable manner, and performs server management processing to manage the servers (i.e., nodes) deployed in respective data centers.

It should be noted that the server management apparatus 150 is not limited to being an external function of the OSS/BSS 140 or the MANO 130 as shown in FIG. 2. For example, the server management apparatus 150 may be provided inside the OSS/BSS 140 or alternatively inside the MANO 130. In this case, the server management function of the server management apparatus 150 is a part of the functions of the OSS/BSS 140 or the MANO 130.

Figure 3:
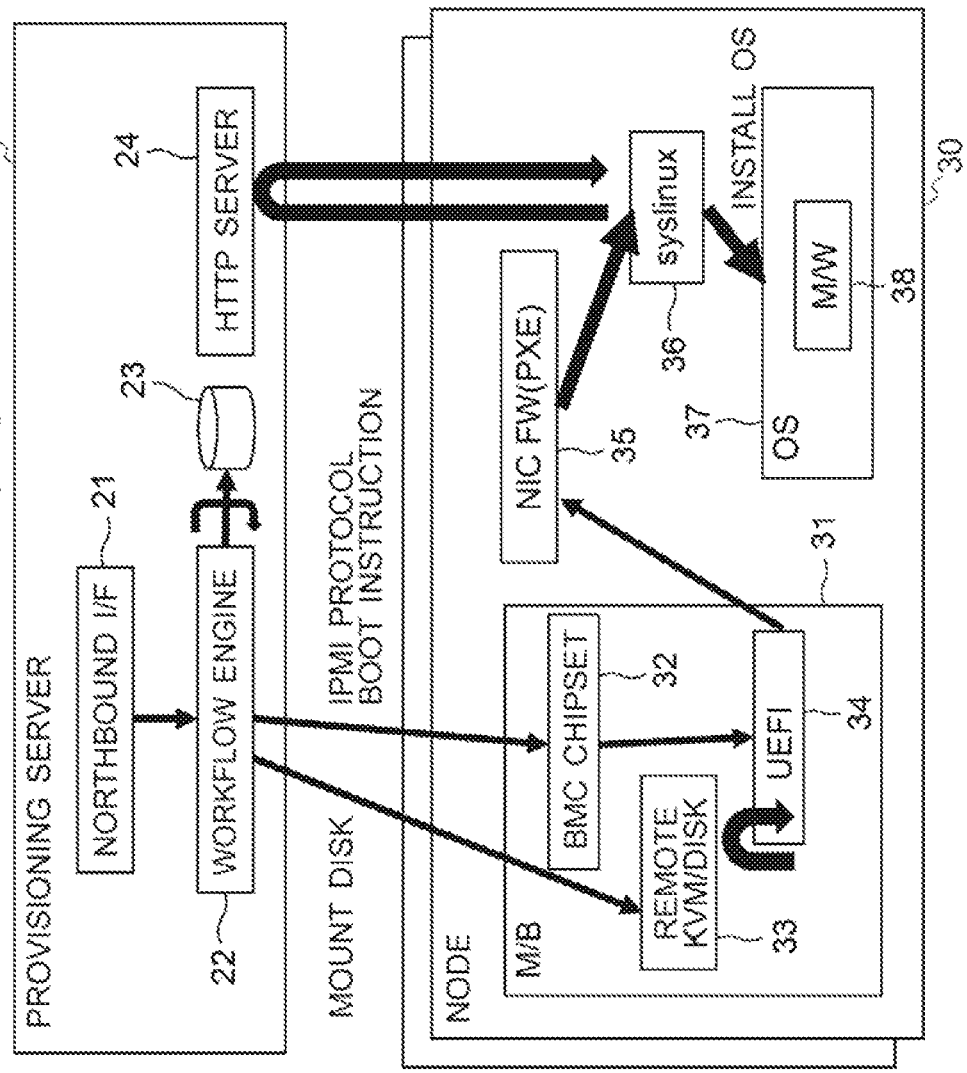
FIG. 3 is a schematic diagram illustrating an exemplary entire configuration of server provisioning according to the present embodiment.

FIG. 3 is a schematic diagram illustrating an exemplary entire configuration of the server provisioning according to the present embodiment.

A provisioning server 20 includes a northbound interface (Northbound I/F) 21, a workflow engine 22, an information management database 23, and an HTTP (Hypertext Transfer Protocol) server 24. The provisioning server 20 serves as the server management apparatus according to the present embodiment.

A plurality of nodes 30 are connected to the provisioning server 20 via a network, respectively. Each node 30 is equipped with a motherboard (M/B) 31. The motherboard 31 is equipped with a BMC (Baseboard Management Controller) chipset 32, a remote disk 33, which is mounted by way of a remote KVM, and a UEFI (Unified Extensible Firmware Interface) 34. Here, KVM is an abbreviation for a Keyboard, Video, and Mouse. Although not specifically shown in the figures, the motherboard 31 may be equipped with various chipsets, expansion slots, and connectors for connecting power supplies and various disk drives in addition to the above.

The provisioning server 20 activates the workflow engine 20 according to the trigger input via the northbound interface 21.

The workflow engine 22 acquires node information of a plurality of nodes (i.e., servers) 30 to be provisioned from the information management database 23, which manages the node information (i.e., server information) of a plurality of nodes that constitute the mobile network 100, and generates necessary files for each of a plurality of nodes 30 based on the acquired node information.

More particularly, the workflow engine 22 generates, based on the node information, a disk image of the remote disk 33 to be mounted on each of a plurality of nodes 30, and issues, to the corresponding node 30 via the network, a disk mount command to mount the remote disk 33. It is possible to mount the remote disk 33 using the remote disk function (i.e., virtual media function) out of the remote KVM functions of the motherboard 31.

In addition, the workflow engine 22 is capable of issuing a power command (i.e., boot instruction) to turn on the power of the node 30 to the node 30 via the network. The boot instruction may be an IPMI (Intelligent Platform Management Interface) command using the IPMI protocol.

The node 30 is powered on by receiving the boot instruction from the provisioning server 20 using the IPMI/BMC. When the power of the node 30 is turned on, the UEFI 34 is activated, and the activated UEFI 34 loads information written to the remote disk 33 to perform initial settings such as network settings.

The node 30 is also equipped with a NIC (Network Interface Card) adapted to the PXE (Preboot eXecution Environment). The node 30 boots up a bootloader (e.g., syslinux) by the NIC firmware (i.e., PXE) 35 using the information written to the remote disk 33, and sends a distribution request for the OS to be installed to the provisioning server 20. Subsequently, in response to the distribution request, the node 30 acquires the OS package including the OS image, OS configuration file, and the like, from the HTTP server 24 so as to install the OS 37.

It should be noted that the workflow engine 22 may also install middleware (M/W) 38 or the like on the node 30 after the OS 37 is installed on the node 30.

Figure 4:
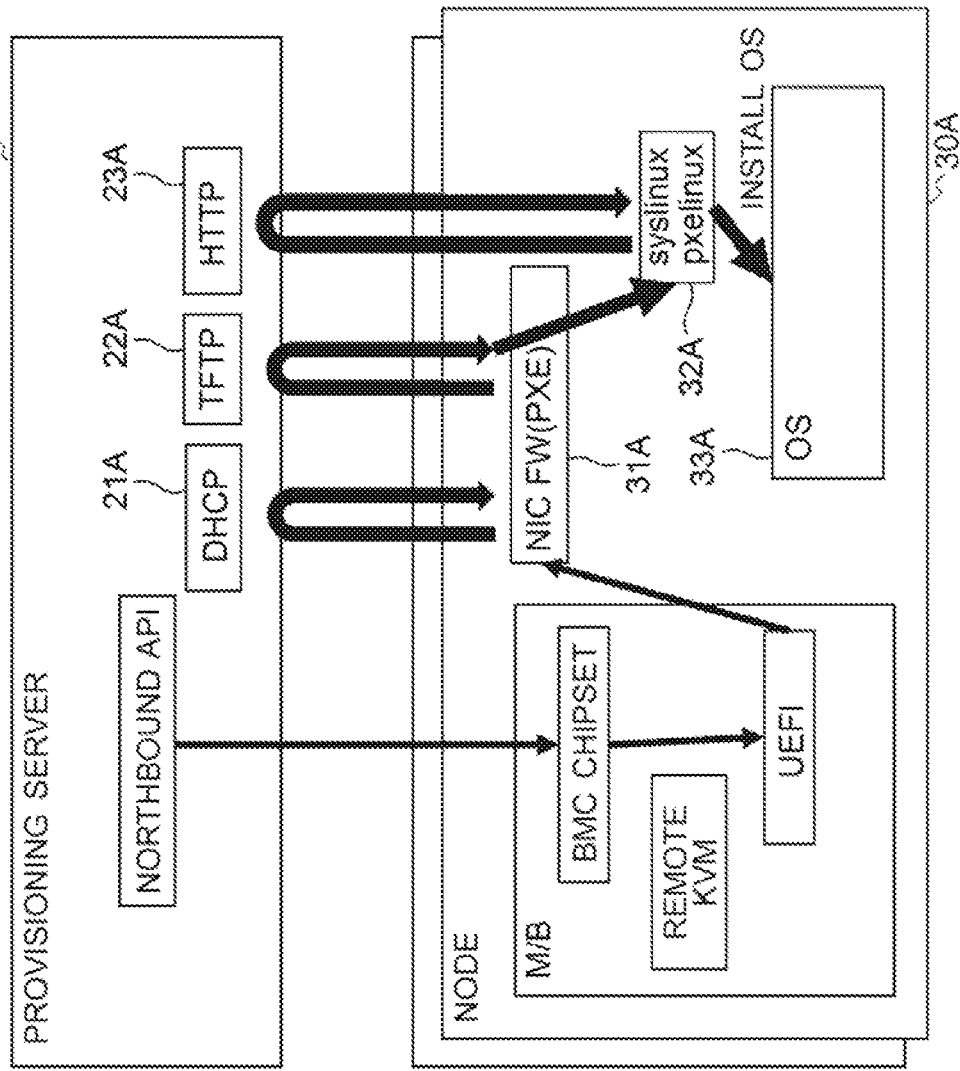
FIG. 4 is a schematic diagram illustrating an entire configuration of conventional server provisioning.

FIG. 4 is a schematic diagram illustrating an exemplary entire configuration of the conventional server provisioning.

FIG. 4 shows a certain example employing the PXE boot, which performs a network boot from the firmware written to the NIC.

The conventional PXE boot requires a boot image to be acquired via the network. For this reason, the conventional PXE boot necessarily requires the TFTP server for distributing the boot image and the DHCP server for providing an address for communicating with the TFTP server.

In other words, as shown in FIG. 4, the provisioning server 20A necessarily includes the DHCP server 21A, the TFTP server 22A, and the HTTP server 23A.

According to the boot instruction from the provisioning server 20A, each of nodes 30A sends a DHCP request to the DHCP server 21A by the NIC firmware (i.e., PXE) 31A. The DHCP request includes an IP address request, a TFTP server address request, and the like.

When receiving the response from the DHCP server 21A, each node 30A sends the TFTP request to the TFTP server 22A based on the received information, and acquires a boot script (e.g., boot image) from the TFTP server 22A to execute the acquired boot script.

Subsequently, each node 30A boots up the bootloader 32A by the executed boot script, and sends a distribution request to the HTTP server 23A to distribute the OS. Resultantly, each node 30A acquires the OS package from the HTTP server 23A as a response to the distribution request and installs the OS 33A.

As mentioned above, the conventional PXE boot necessarily requires the DHCP server and the TFTP server. However, as the DHCP server needs to be installed in each L2 network, it is necessary to install the DHCP server in each of data centers or each of racks in a large-scale network such as the mobile network 100. In other words, it is necessary to constitute the provisioning server 20A for each of data centers or each of racks as well.

In contrast, according to the present embodiment, neither the DHCP server nor the TFTP server is required. In each of nodes 30, when the power is turned on, the UEFI 34 first reads the information written in the remote disk 33 mounted in advance, and thus it makes it possible to realize the conventional functions of the DHCP server and the TFTP server, such as setting the IP address. In other words, the unique configuration information of each node 30 can be managed by the remote disk 33 of each of nodes 30, thereby eliminating the need for IP address assignment by the local network. Therefore, it makes it possible to install the OS simply by acquiring the OS package from the HTTP server. As a result, it makes it possible to eliminate the complicated configuration, which is conventionally required in the L2 network.

Hereinafter, more detailed configuration of the provisioning server 20 will be described.

Figure 5:
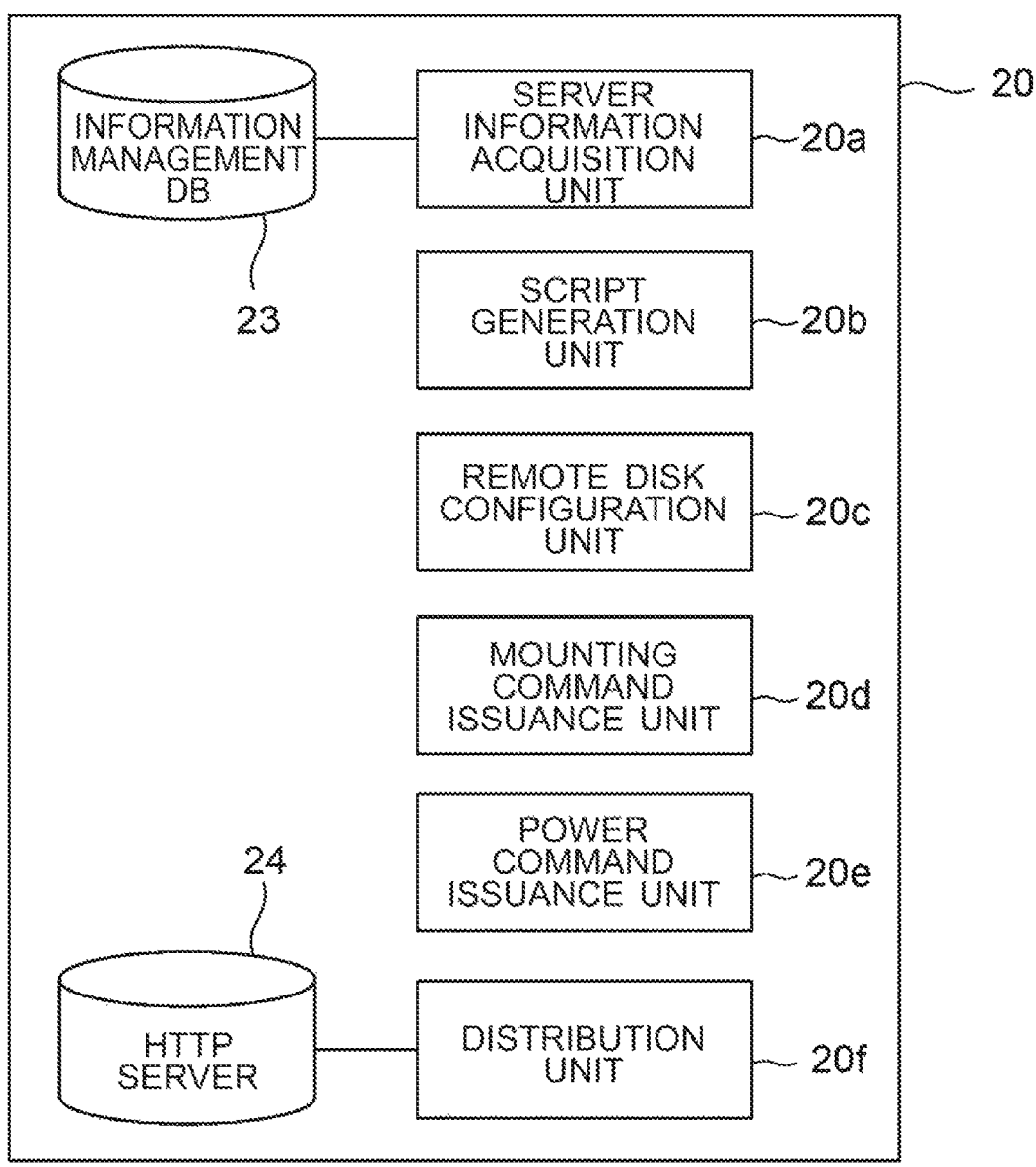
FIG. 5 is a block diagram illustrating an exemplary functional configuration of a provisioning server.

FIG. 5 is a block diagram illustrating an exemplary functional configuration of the provisioning server 20.

As shown in FIG. 5, the provisioning server 20 includes a server information acquisition unit 20a, a script generation unit 20b, a remote disk configuration unit 20c, a mounting command issuance unit (corresponding to a command issuance unit) 20d, a power command issuance unit (corresponding to a second command issuance unit) 20e, and a distribution unit 20f.

The server information acquisition unit 20a acquires node information (i.e., server information) from the information management database 23 according to instructions from the administrator.

The information management database 23 is a database that manages the node information of a plurality of nodes 30 that constitute the mobile network 100. The node information managed by the information management database 23 is inventory information required for provisioning the nodes 30, and includes configuration information and identifier information of the node. For example, the node information may include identification information of the node (e.g., ID, code, serial number, MAC address, IP address), identification information of the data center to which the node belongs (e.g., ID, type, code), and positional information of the node (e.g., rack name, rack number in the data center). The node information may also be managed in the information management database 23, for example, in units of clusters (e.g., in units of data centers (i.e., in units of GCs), in units of racks, in unit of PODs).

The server information acquisition unit 20a receives information on the target node for provisioning (e.g., GC type) specified by the administrator, and acquires the corresponding node information from the information management database 23 based on the received information. The node information acquired at this time may be the node information in units of clusters (e.g., in units of GCs).

The script generation unit 20b generates iPXE scripts corresponding to a plurality of nodes 30 belonging to the cluster concerned, respectively, based on the node information in units of clusters. Each of the iPXE scripts is a script for booting each of nodes 30 and includes the configuration information of each node 30 and the identifier information such as the IP address of each node 30.

More particularly, the script generation unit 20b embeds the necessary information based on the node information acquired by the server information acquisition unit 20a into a pre-defined template of the iPXE script so as to generate the iPXE script for each of nodes. For example, the template of the iPXE script may be stored in the information management database 23 for each of node types, GC types, or the like.

Furthermore, the script generation unit 20b generates an installation procedure corresponding to each of a plurality of nodes 30 belonging to the cluster concerned based on the node information in units of clusters, and stores the generated installation procedure in the HTTP server 24. Here, the above installation procedure is a kickstart file that sets the OS installation scenario for each node 30.

More particularly, the script generation unit 20b is able to generate the kickstart file for each node by embedding the necessary information based on the node information acquired by the server information acquisition unit 20a into the pre-defined template of the kickstart file. For example, the template of the kickstart file may be stored in the information management database 23 for each of node types, GC types, or the like.

The remote disk configuration unit 20c generates a disk image with the iPXE script generated by the script generation unit 20b being written therein, and configures the generated disk image as the remote disk to be mounted on each node 30.

The mount command issuance unit 20d issues a disk mount command to the corresponding node 30 via the network to mount the remote disk configured by the remote disk configuration unit 20c on the corresponding node 30. As a result, the remote disk 33 is mounted on the motherboard 31 equipped in the node 30 to which the command is issued.

The power command issuance unit 20e issues a power command (i.e., boot instruction) to the node 30 via the network to turn on the power of the node 30.

When the distribution unit 20f receives a distribution request for an OS from the node 30, in response to the distribution request, the distribution unit 20f distributes the OS package and the kickstart file stored in the HTTP server 24 to the node 30 from which the distribution request is sent.

Although the present embodiment describes a certain case in which the HTTP server is used as the file server, alternatively, the file server may also be a HTTPS (Hypertext Transfer Protocol Secure) server, an NFS (Network File System) server, or the like.

Figure 6:
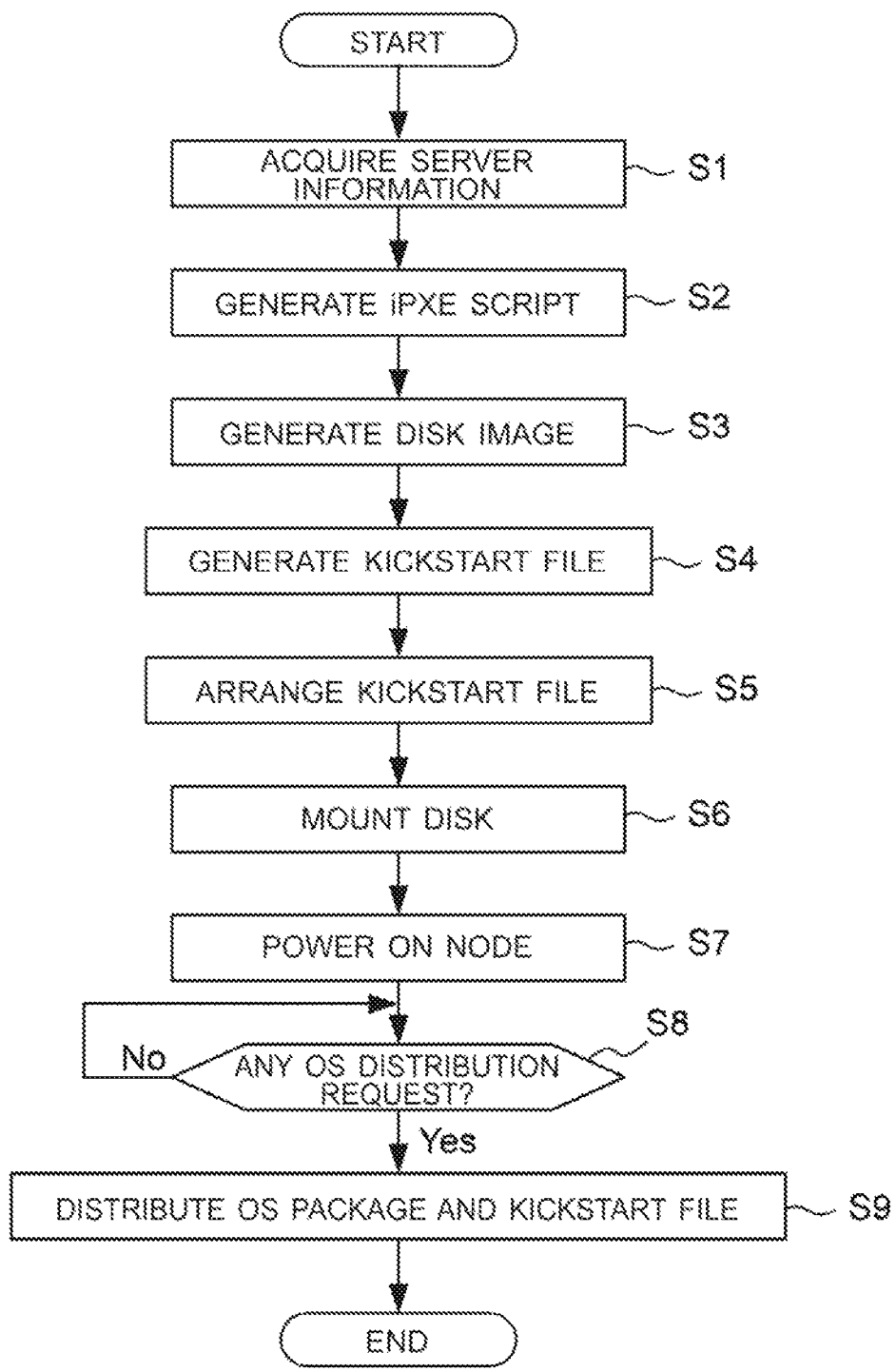
FIG. 6 is a flowchart illustrating an exemplary operational processing procedure of the provisioning server.

FIG. 6 is a flowchart illustrating an exemplary operational processing procedure of the provisioning server 20.

The processing shown in FIG. 6 starts at the timing when the workflow engine 22 is activated.

First, in step S1, the server information acquisition unit 20a acquires the node information of a plurality of target nodes, and the processing proceeds to step S2.

In Step S2, the script generation unit 20b generates the iPXE script for each of the nodes based on the node information acquired in step S1, and the processing proceeds to step S3.

In step S3, the remote disk configuration unit 20c generates a disk image for each of the nodes in which the iPXE script for each node generated in step S2 is written to configure the remote disk to be mounted on each node 30, and the processing proceeds to step S4.

In step S4, the script generation unit 20b generates the kickstart file for each of the nodes based on the node information acquired in step S1, and the processing proceeds to step S5.

In step S5, the script generation unit 20b arranges the kickstart file generated in step S4 in the HTTP server 24, and the processing proceeds to step S6.

In step S6, the mounting command issuance unit 20d issues a disk mounting command to each of the nodes 30 via the network to mount the remote disk configured in step S3 on the corresponding node 30, and the processing proceeds to step S7.

In step S7, the power command issuance unit 20e issues a power command (i.e., boot instruction) to each of the nodes 30 via the network to turn on the power of each node 30.

In step S8, the distribution unit 20f determines whether or not the OS distribution request is received from the node 30. When the distribution unit 20f has not received the OS distribution request from the node 30, the distribution unit 20f awaits until the OS distribution request is received. On the other hand, when the distribution unit 20f receives the OS distribution request from the node 30, the processing proceeds to step S9, and the distribution unit 20f distributes, to the node 30 from which the OS distribution request is sent, the OS package stored in the HTTP server 24 and the kickstart file corresponding to the node 30 from which the OS distribution request is sent.

Figure 7:
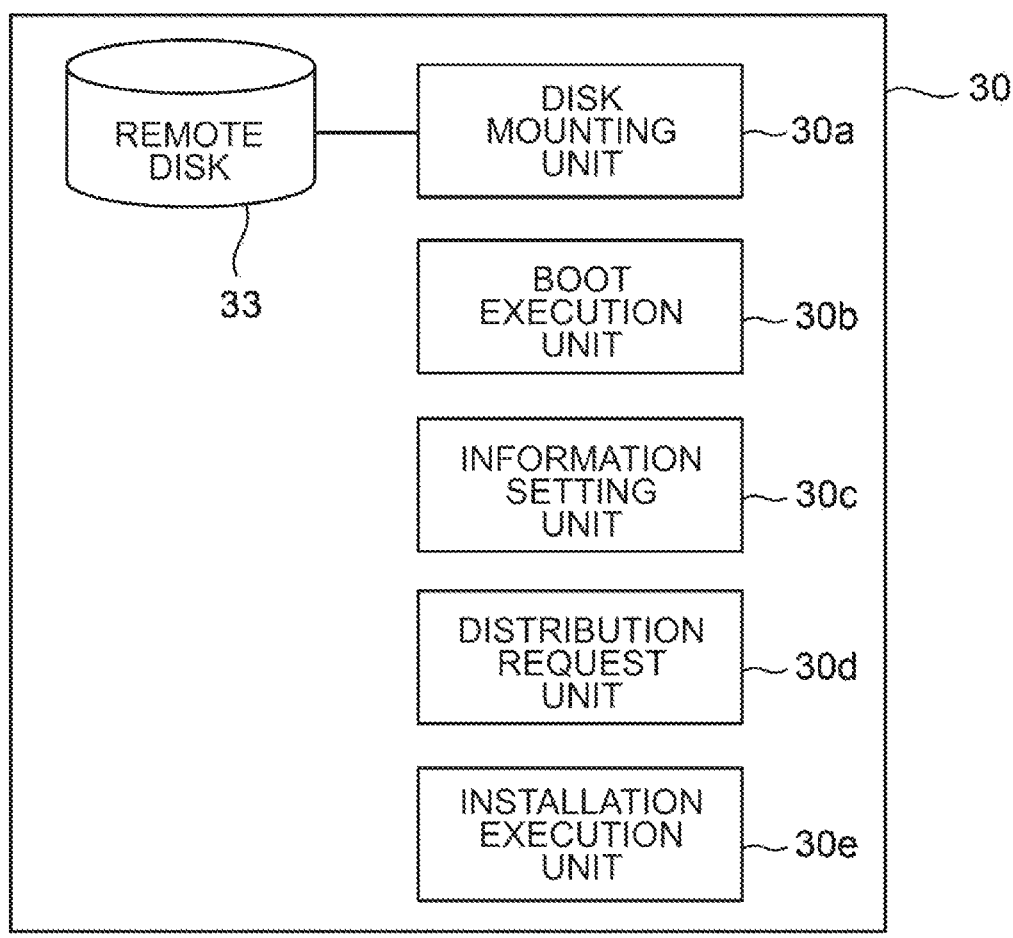
FIG. 7 is a block diagram illustrating an exemplary functional configuration of a node.

FIG. 7 is a block diagram illustrating an exemplary functional configuration of the node 30.

As shown in FIG. 7, the node 30 includes a disk mounting unit 30a, a boot execution unit 30b, an information setting unit 30c, a distribution request unit 30d, and an installation execution unit 30e.

The disk mounting unit 30a receives the disk mounting command from the provisioning server 20 to mount the remote disk 33, and mounts the remote disk 33 on the motherboard 31 according to the received command. The remote disk 33 has the iPXE script which is written therein.

The boot execution unit 30b reads the iPXE script written in the remote disk 33 and executes the boot, triggered by the power command issued from the provisioning server 20.

The information setting unit 30c sets the node configuration information, IP address, and the like, included in the iPXE script read from the remote disk 33 to its own node.

The distribution request unit 30d sends the distribution request for the OS to be installed to the provisioning server 20 using the IP address set to its own node. The distribution request unit 30d also receives the OS package and the kickstart file distributed from the provisioning server 20 in response to the sent distribution request.

The installation execution unit 30e installs the OS according to the procedures in the kickstart file.

Figure 8:
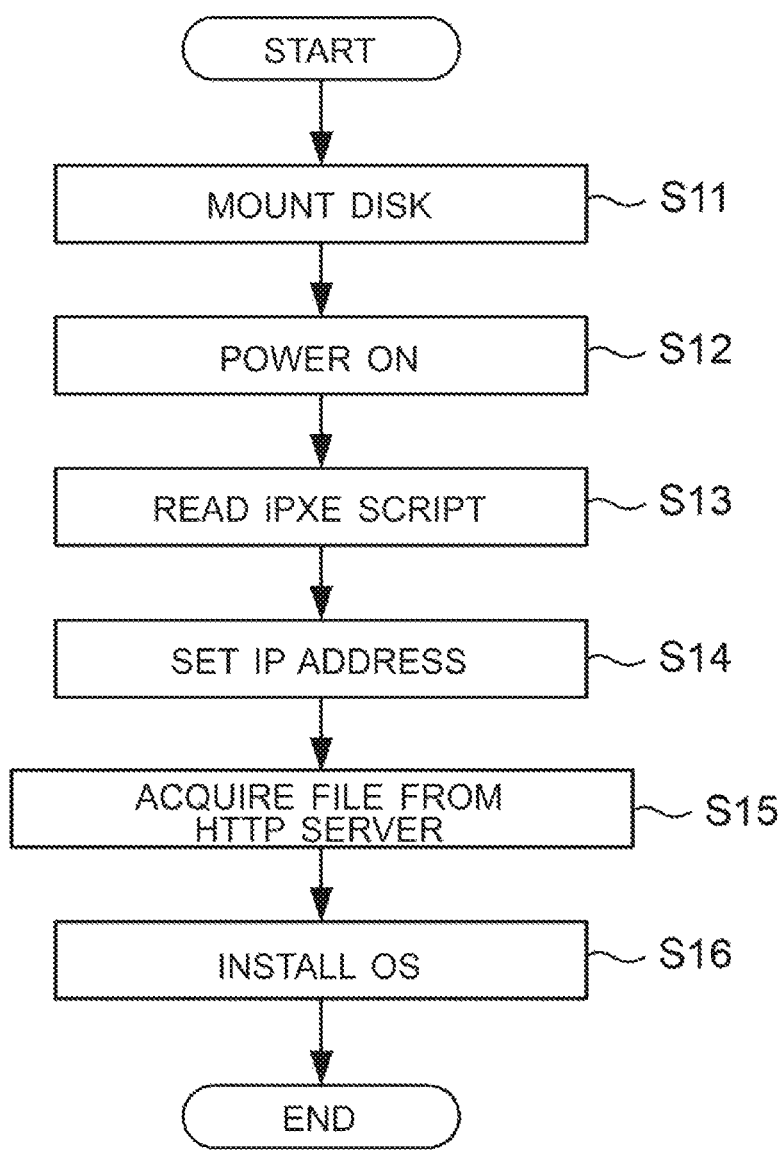
FIG. 8 is a flowchart illustrating an exemplary operational processing procedure of the node.

FIG. 8 is a flowchart illustrating an exemplary operational processing procedure of the node 30.

The processing shown in FIG. 8 starts when the node 30 is not powered on, and at the timing of receiving the disk mounting command from the provisioning server 20.

First, in step S11, the disk mounting unit 30a mounts the remote disk 33 according to the disk mounting command issued from the provisioning server 20, and the processing proceeds to step S12.

Subsequently, in step S12, the boot execution unit 30b receives the boot instruction from the provisioning server 20 and turns on the power of the node 30, and the processing proceeds to step S13.

In step S13, the boot execution unit 30b activates the UEFI 34 and reads the iPXE script from the remote disk 33, and the processing proceeds to step S14.

In step S14, the information setting unit 30c performs the network settings such as IP address settings based on the iPXE script read in step S13, and the processing proceeds to step S15.

In step S15, the distribution request unit 30d sends the distribution request for the OS to the HTTP server 24 using the IP address set in step S14, and acquires the OS package and the kickstart file from the HTTP server 24, and the processing proceeds to step S16.

In step S16, the installation execution unit 30*e* executes the installation of the OS using the OS package acquired in step S15 according to the kickstart file acquired in step S15.

Figure 9:
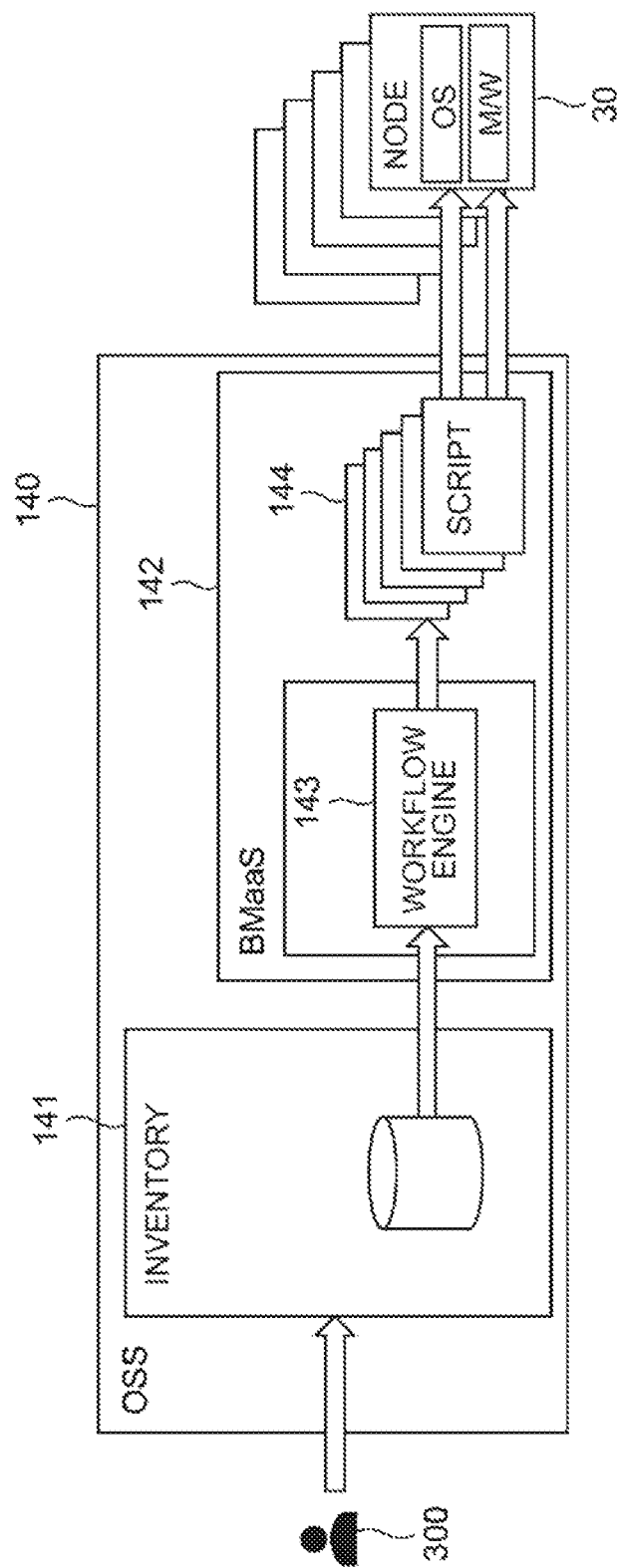
FIG. 9 is a schematic diagram illustrating an exemplary sequence of the server provisioning in the mobile network according to the present embodiment.

In the mobile network 100 according to the present embodiment, as shown in, for example, FIG. 9, the OSS 140, which serves as the uppermost layer of the virtualized network, may provide a inventory management function 141, which manages the inventory information such as the configuration information and the identifier information for respective nodes 30 constituting the mobile network 100, and a BMaaS (Bare Metal as a Service) function 142, which generates and deploys scripts for executing boot and OS installation for each of nodes using the above inventory information. Here, the workflow engine 143 provided in the BMaaS 142 corresponds to the workflow engine 22 shown in FIG. 3, and the script 144 corresponds to the iPXE script generated by the workflow engine 22 shown in FIG. 3.

In this way, the OSS 140 is able to provide the functions of provisioning server 20 shown in FIG. 3.

Figure 10:
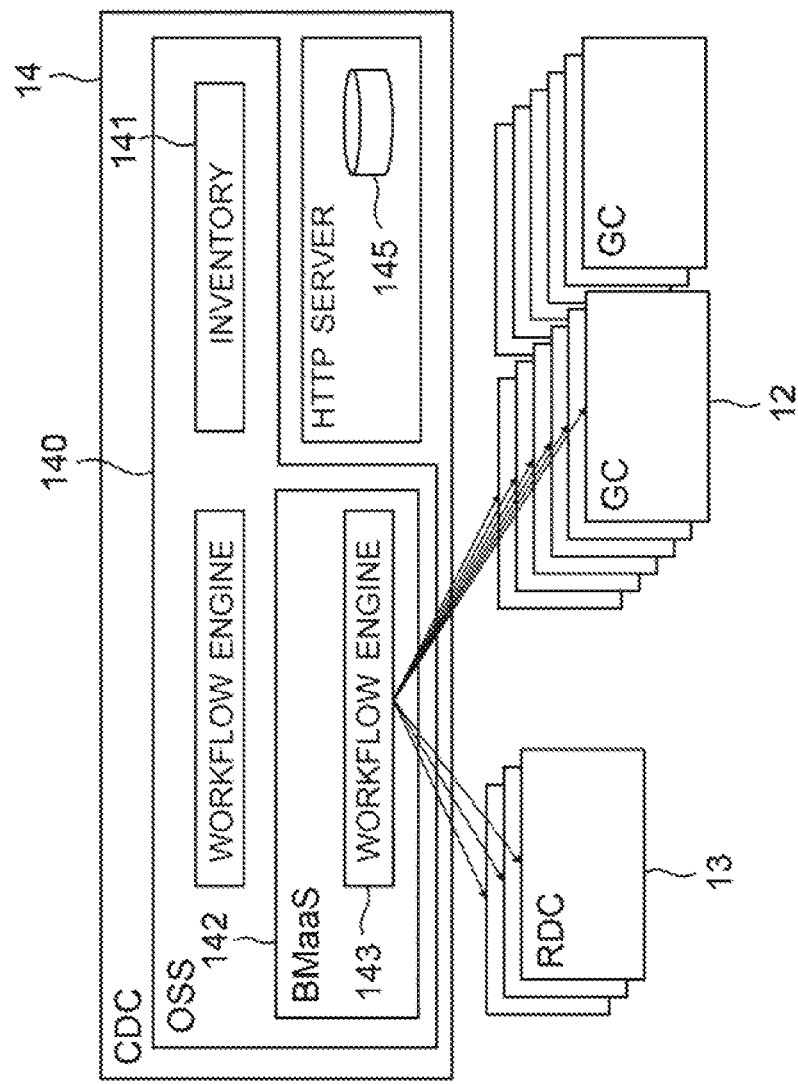
FIG. 10 is a conceptual diagram illustrating an exemplary configuration of an orchestration in the mobile network system.

In this case, in the mobile network 100 according to the present embodiment, for example, as shown in FIG. 10, by solely constructing a single set of the inventory management function 141, the BMaaS 142, and the HTTP server 145 in the central data center (CDC) 14, it makes it possible to deploy servers a large number of edge data centers (GCs) 12 and a large number of regional data centers (RDCs) 13 connected via the network to each other. Here, the HTTP server 145 corresponds to the HTTP server 24 shown in FIG. 3.

In this way, it makes it possible for the central data center (CDC) to centrally control the server deployment and provisioning.

As described above, the provisioning server 20 according to the present embodiment generates the iPXE script that corresponds to each of a plurality of nodes 30 based on the node information of a plurality of nodes 30 constituting the mobile network 100. Then, the provisioning server 20 mounts the disk image with the generated iPXE script being written therein on the remote disk 33 of the corresponding node 30. Here, the iPXE script is a script for booting up each node 30, which includes the configuration information and the identifier information (such as IP address) of each node.

Furthermore, the provisioning server 20 is capable of issuing the power command to each node 30 via the network to turn on the power of each node 30.

Therefore, in each of nodes 30, triggered by the power command issued from the provisioning server 20, by simply reading and executing the iPXE script from the remote disk 33, it makes it possible for each node 30 to set its own IP address and boot up its own node and the like without acquiring the IP address from the DHCP server and the boot script from the TFTP server.

In this way, the provisioning server 20 manages the unique configuration information such as IP addresses of a plurality of nodes 30 that constitute the mobile network 100, and uses the remote disk function to deploy the boot scripts including the above configuration information for respective nodes 30. Therefore, each of the nodes 30 is able to set the IP address and the like and acquire the boot script by simply referring to the remote disk 33 mounted on its own node.

As a result, it makes it possible to eliminate the DHCP server and the TFTP server, which were required for the conventional PXE boot, and also eliminate the complicated settings of, for example, the L2 network. In addition, each node 30 does not need to make requests to the DHCP server and the TFTP server, respectively.

Yet furthermore, when the provisioning server 20 receives the distribution request for the OS from each node 30 using the IP address set for each node 30, in response to the request, the provisioning server 20 distributes the OS package and the kickstart file stored in the HTTP server 24 to the node 30 from which the distribution request is sent.

In other words, in each of the nodes 30, by executing the iPXE script and sending the distribution request for the OS to the provisioning server 20 using the IP address set to its own node, it makes it possible to download the OS package and the kickstart file from the HTTP server 24. Subsequently, each node 30 is able to run the acquired kickstart file so as to install the OS.

As described above, the remote disk 33, which is mounted on each node 30, is sufficient to have only the function of performing the initial network settings and booting up the node 30, while the files required for the OS installation (e.g., OS package, kickstart file, and the like) are arranged in the HTTP server 24. When installing the OS, each node 30 acquires the necessary files from the HTTP server 24 to install the OS thereon. In other words, instead of mounting all the information necessary for provisioning on the remote disk 33, only the minimum necessary information is mounted on the remote disk 33, which makes the remote disk 33 significantly light.

In addition, the provisioning server 20 is able to generate the kickstart file for each of a plurality of nodes 30 based on the node information of a plurality of nodes 30 that constitute the mobile network 100, and store the generated kickstart file in the HTTP server 24, which is a file server in which the OS package is stored.

As a result, it makes it possible for each of nodes 30 to follow the kickstart file to install the OS according to the appropriate scenario depending on its own environment.

As described above, according to the present embodiment, it makes it possible to realize a boot provisioning server using the remote disk function, and massively deploy servers in a large-scale network more expeditiously and efficiently.

The server management apparatus 150 according to the present embodiment may be implemented in any of general-purpose servers that constitute the backhaul network, the core network, or the like, of the mobile network 100. Alternatively, the server management apparatus 150 may be implemented in a dedicated server. The server management apparatus 150 may also be implemented on a single or a plurality of computers.

When the server management apparatus 150 is implemented on a single computer, the server management apparatus 150 may include a CPU, a ROM, a RAM, an HDD, an input unit (e.g., keyboard, pointing device, or the like), a display unit (e.g., monitor or the like), a communication I/F, and the like. In this case, at least a part of the functions of the constituent elements of the server management apparatus 150 shown in FIG. 3 may be performed by executing the program by the above CPU. However, at least a part of the constituent elements of the server management apparatus 150 shown in FIG. 3 may be operated as dedicated hardware. In this case, the dedicated hardware operates based on the control of the above CPU.

Although certain embodiments have been described above, the embodiments described are merely illustrative and are not intended to limit the scope of the present invention. The apparatus and methods described herein may be embodied in other forms than those described above. In addition, without departing from the scope of the present invention, omissions, substitutions, and modifications may be made to the above embodiments as appropriate. Such omissions, substitutions, and modifications fall within the scope of the appended claims and equivalents thereof, and fall within the technical scope of the present invention.

REFERENCE SIGNS LIST

11: Base Station; 12: Edge Data Center; 13: Regional Data Center, 14: Central Data Center, 20: Provisioning Server, 22: Workflow Engine; 23: Information Management Database; 24: HTTP Server, 30: Node; 31: Motherboard; 33: Remote Disk; 34: UEFI; 35: NIC Firmware (PXE); 100: Mobile Network; 150: Server Management Apparatus

What is claimed is:

1. A server management apparatus, comprising:
at least one memory configured to store program code; and
electronic circuitry including at least one processor, the at least one processor being configured to read and operate according to the program code, the electronic circuitry configured to:
acquire configuration information and identifier information of a plurality of servers that constitute a network;
generate a script for booting each server for each of the plurality of servers based on the configuration information and the identifier information of the plurality of servers, the script including the configuration information and the identifier information of each server;
write the script to a remote disk to be mounted on each of the plurality of servers to configure the remote disk; and
issue, to each of the plurality of servers via the network, a command to mount the remote disk on a corresponding server.

2. The server management apparatus according to claim 1, wherein
the identifier information includes at least an IP (Internet Protocol) address of each server.

3. The server management apparatus according to claim 1, the electronic circuitry further configured to:
issue, to each of the plurality of servers via the network, a second command to turn on a power of each server.

4. The server management apparatus according to claim 1, the electronic circuitry further configured to:
distribute, in response to a request from each of the plurality of servers to distribute an OS (Operating System) to be installed using the identifier information for each server, the OS and an installation procedure to a source server of the request.

5. The server management apparatus according to claim 1, wherein
the booting is a PXE boot, and the script is an iPXE script.

6. A server management method performed by a server management apparatus, comprising steps of:
acquiring configuration information and identifier information of a plurality of servers that constitute a network;
generating a script for booting each server for each of the plurality of servers based on the configuration information and the identifier information of the plurality of servers, the script including the configuration information and the identifier information of each server;
writing the script to a remote disk to be mounted on each of the plurality of servers to configure the remote disk; and
issuing, to each of the plurality of servers via the network, a command to mount the remote disk on a corresponding server.

7. A non-transitory computer-readable recording medium having recorded thereon a server management computer program executable by a computer to perform a server management method comprising:
acquiring configuration information and identifier information of a plurality of servers that constitute a network;
generating a script for booting each server for each of the plurality of servers based on the acquired configuration information and the acquired identifier information of the plurality of servers, the script including the configuration information and the identifier information of each server;
writing the generated script to a remote disk to be mounted on each of the plurality of servers to configure the remote disk; and
issuing, to each of the plurality of servers via the network, a command to mount the configured remote disk on a corresponding server.

\* \* \* \* \*